United States Patent [19]

Jacob

[11] Patent Number: 4,966,473
[45] Date of Patent: Oct. 30, 1990

[54] BEARING ASSEMBLY FOR A WHEEL OF A MOTOR VEHICLE

[76] Inventor: Werner Jacob, Briandring 29, D-6000 Frankfurt am Main 70, Fed. Rep. of Germany

[21] Appl. No.: 428,129
[22] Filed: Oct. 27, 1989

Related U.S. Application Data

[62] Division of Ser. No. 220,481, Dec. 14, 1987, Pat. No. 4,917,510.

[51] Int. Cl.⁵ ............................................. F16C 33/60
[52] U.S. Cl. .................................... 384/477; 384/503; 384/505; 384/544
[58] Field of Search ............... 384/497, 503, 505, 542, 384/537, 585, 570, 544, 477

[56] References Cited

U.S. PATENT DOCUMENTS

| | | | |
|---|---|---|---|
| 2,936,199 | 5/1960 | Kelly | 384/503 |
| 3,592,519 | 7/1971 | Martin | 384/503 |
| 4,129,345 | 12/1978 | Krude | 384/497 |
| 4,786,115 | 11/1988 | Ashberg | 384/505 |

FOREIGN PATENT DOCUMENTS

| | | |
|---|---|---|
| 2260413 | 6/1973 | Fed. Rep. of Germany . |
| 3239058 | 4/1984 | Fed. Rep. of Germany . |
| 1320415 | 6/1973 | United Kingdom . |

*Primary Examiner*—Lenard A. Footland
*Attorney, Agent, or Firm*—Toren, McGeady & Associates

[57] ABSTRACT

The invention relates to a bearing assembly in an especially drivable wheel hub at the associated wheel carrier of a motor vehicle. It comprises a double row angular ball bearing whose outer bearing ring is first produced as one part and is then divided by breaking it apart. The special arrangement and design of the joint ensures a close connection between the two bearing ring parts and permits a method of assembly allowing the two bearing rows to be filled with a larger number of rolling members.

5 Claims, 4 Drawing Sheets

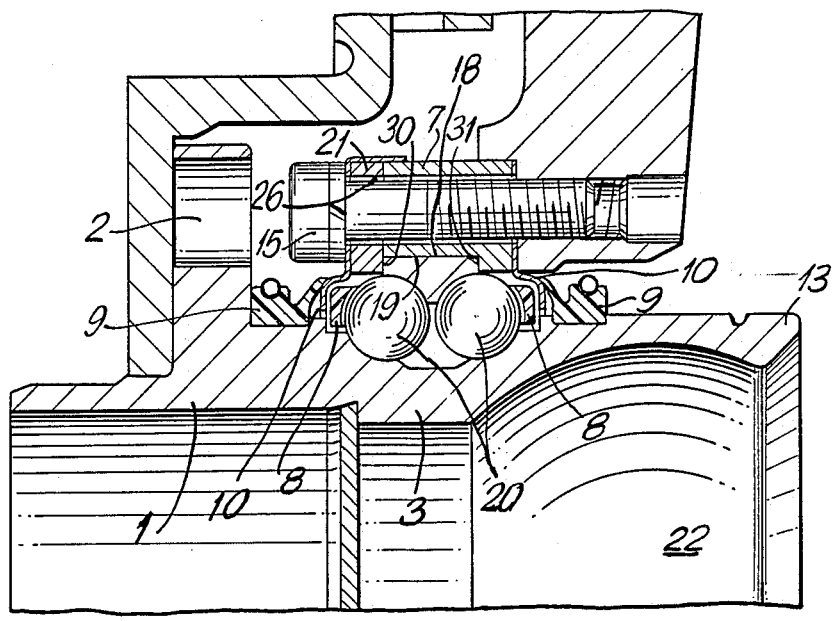
FIG. 5
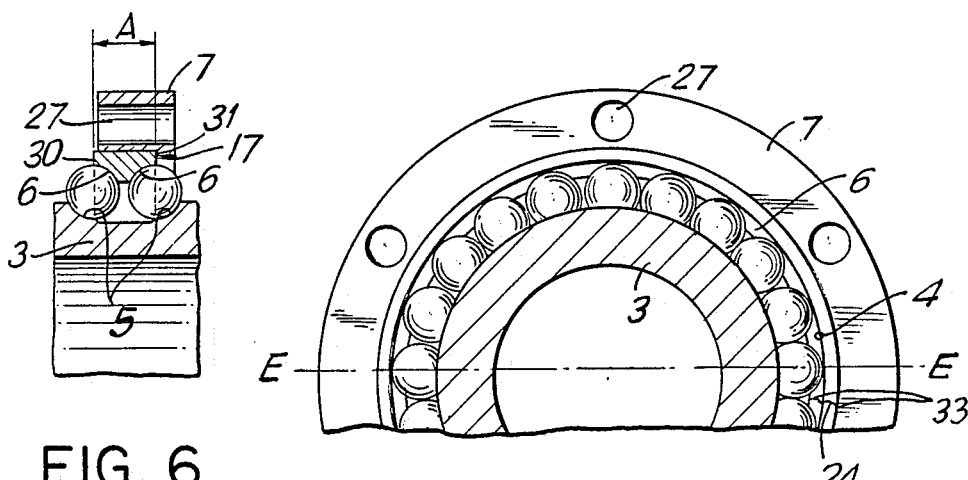
FIG. 6
FIG. 7

BEARING ASSEMBLY FOR A WHEEL OF A MOTOR VEHICLE

This is a divisional application of Ser. No. 220,481, filed Dec. 14, 1987, now U.S. Pat. No. 4,917,510.

The invention relates to a bearing assembly of an especially drivable wheel hub at the associated wheel carrier of a motor vehicle, having a double-row roller bearing whose outer divided bearing ring has been provided for being fixed to the wheel carrier and whose inner single-part bearing ring forms one unit with the wheel flange for attaching the vehicle wheel.

In the case of bearing assemblies with undivided bearing rings the two bearing tracks for the rows of rolling members are provided at a distance from one another in the bearing ring. The advantage of such a design is that the two bearing tracks can be produced accurately, for example it is possible to observe an accurate distance between the two tracks. This is achieved by machining the two tracks in a clamping device, which means that they are also at an identical distance from the axis of rotation. With bearings, dimensional deviations lead to noise and/or a reduced service life. However, the disadvantage of a wheel bearing assembly with an undivided outer bearing ring and inner bearing ring is that its degree of filling is reduced relative to the bearing diameter. The degree of filling is approximately 65% of that of bearings with divided bearing rings. However, divided bearing rings require centring relative to the axis of rotation and accuracte machining of a further radial face in order to ensure an accurate distance between the bearing tracks.

A wheel bearing assembly for motor vehicles with singlepart bearing rings is known from DE-OS 2260413 for example, whereas a wheel bearing assembly with a divided outer bearing ring is disclosed in DE-OS 2654607. From the latter publication it can also be seen that a row can only be filled up to 50% with rolling members in order to permit assembly.

A further disadvantage of divided outer bearing rings of the disclosed design is that the centring means have to accommodate the forces occurring for example when negotiating curves or upon impact, when hitting a kerbstone for instance, such forces acting on the bearing in the form of a tilting moment in that the rings tend to be displaced relative to each other. In order to avoid negative influences on concentric running and the service life, more sophisticated production methods and higher production expenditure are required to achieve the necessary accuracies for the centring means.

In view of the above it is the object of the invention to provide a wheel bearing assembly which retains the advantages of the design with a divided outer bearing ring in respect of the degree of filling and load bearing capacity, but which on the other hand is characterised by simplified production methods and reduced production expenditure without adversely affecting concentric running and service life, and ensures a high resistance against tilting moments.

In accordance with the invention the objective is achieved in that the outer bearing ring is divided by breaking it apart and the inner bearing ring is integral with a component of a driving joint provided for driving a vehicle wheel or is connected to it via teeth. It is possible to break the outer bearing ring in such a way that two rings are produced, with breaking taking place in the radial plane containing the axis of rotation of the roller bearing.

Breaking may also take place in such a way that the bearing ring is divided axially into two parts, but the joint extends at an angle relative to the axis which deviates from 90°. In the first case, the two bearing ring parts produced by breaking each contain one half of the circumferential extension of the two outer bearing tracks. In the second case, the two bearing ring parts each contain the full circumferential extension of an outer bearing track. Furthermore, it is also possible to burst the outer bearing ring only in one place of its circumferential extension so that a slot occurs when it is bent open.

The advantage of this design is that during the production process the outer bearing ring is still in one part and contains both bearing tracks which may be machined in a clamping device. Due to the breaking method and the special position of the joint occuring in the process, a close connection is produced when rejoining the bearing ring because in the region of the joint there are irregularities which can be brought together in only one position of the two ring parts and result in an engagement of the surface parts. This design helps to achieve self-centring, there is no need for special centring faces or centring measures and furthermore, the joint, due to the close form-fitting connection, helps to receive any tilting moments that might occur.

In a further embodiment of the invention provision has been made for the outer bearing ring to be received in a holding ring in order to achieve a pre-assembled unit. The holding ring has been provided with a radially extending stop face contacted by a corresponding radial face of the outer bearing ring and an inner face for receiving the outer face of the outer bearing ring, with the inner face of the bearing ring covering only part of the axial extension of the outer face of the outer bearing ring.

In order to facilitate final assembly of the bearing unit in the vehicle provision has been made for the holding ring and the outer bearing ring to be connected to each other by assembly bolts. In this way, the wheel bearing unit forms a pre-assemblyed system which needs to be attached to the wheel carrier of the vehicle only.

In a preferred embodiment, the outer bearing ring, with its outer face and at least part of its radial extension, is received in a bored step of the wheel carrier and, via the holding ring, is connected either directly or indirectly to the wheel carrier by fixing bolts.

Breaking the outer bearing ring apart becomes particularly easy if the joints extend through the radial plane containing the bores for receiving the fixing bolts.

To produce the outer bearing ring of the bearing assembly, the invention provides a process according to which the outer bearing ring in a soft condition is first machined in a non-chip forming way to its finish-dimension before grinding, then the outer bearing ring, on its inner and/or outer circumferential face, is provided with notches in those regions from which the broken joints initiate, and subsequently, the outer bearing ring is hardened and ground to its finish dimensions and after grinding it is broken apart by applying pressure which exceeds the limit of elastic deformation. By providing notches it is possible to ensure a specific extension of the joints. In case the joints extend through the tracks the invention provides for the tracks, after breaking, once more to undergo precision machining, especially honing.

Preferred embodiments of the invention are illustrated in the drawing wherein

FIG. 1 is a longitudinal section through one half of a first embodiment of the bearing assembly FIG. 2 is a longitudinal section through a second embodiment in the case of which the outer bearing ring has two joints FIG. 3 is a longitudinal section through an embodiment with the outer bearing ring divided into two parts in accordance with FIG. 2, with the unit being shown in the upper half in an assembled condition and in the lower half prior to assembly FIG. 4 is a lateral view belonging to section to FIG. 3, shown partially in section FIG. 5 is a longitudinal section through an embodiment with a modified holding ring and an outer bearing ring having one joint only FIG. 6 is a partial illustration of the outer bearing ring, the holding ring and the track of the inner bearing ring to FIG. 5

FIG. 7 is a lateral view belonging to FIG. 6

Figure 1:
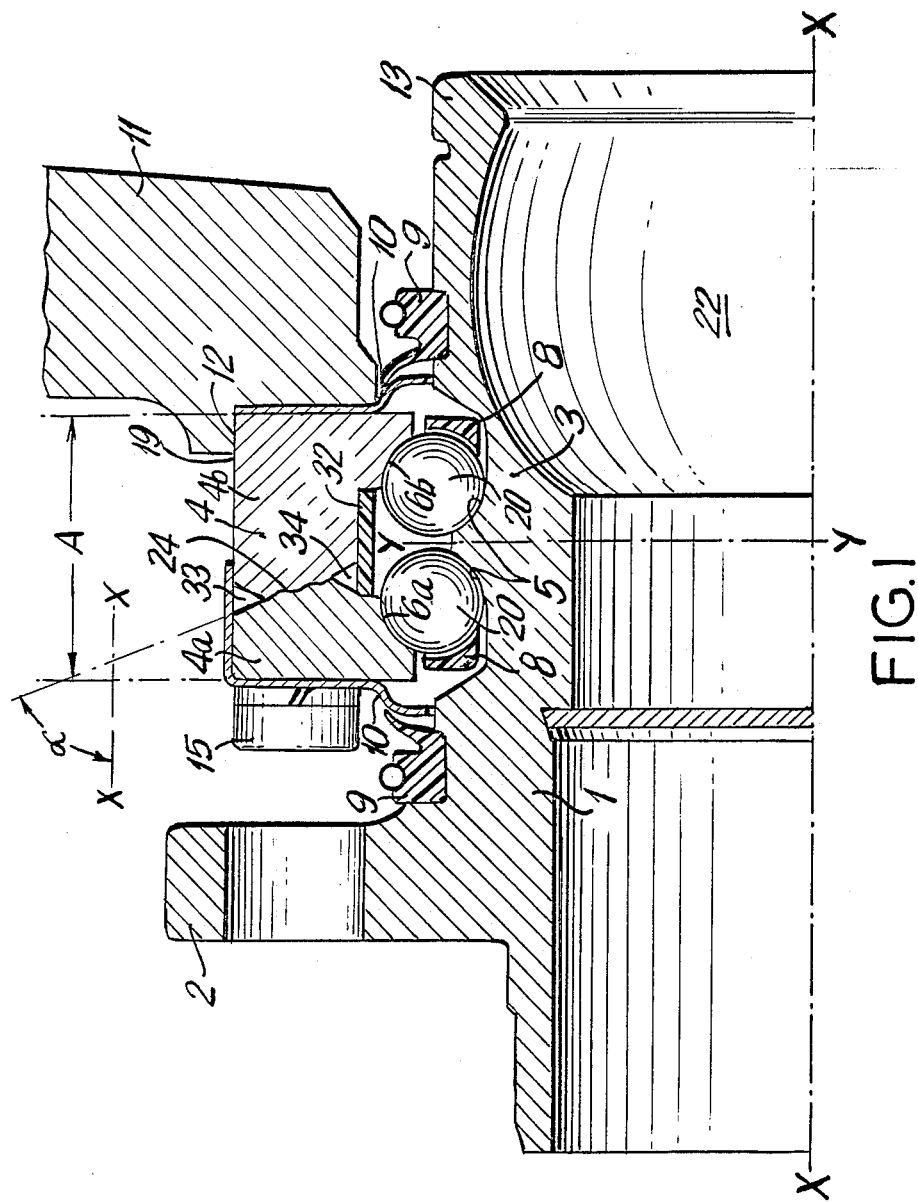

FIG. 1 shows one half of the wheel bearing unit attached to the wheel carrier 11; the wheel hub 1 has been provided with a wheel flange 2 which is integral with it and which serves to attach the brake disc and the vehicle wheel for example. The inner bearing ring 3 also forms part of the wheel hub just as the outer part 13 of the constant velocity universal joint 22 serving to drive the wheel flange 2 and thus the vehicle wheels. The driving joint 22 is not illustrated in detail, only the outer joint member 13 is shown. The rotary motion coming from the engine and transmission is transferred via a joint at the transmission end to an intermediate shaft and via the joint 22 at the wheel end to its outer part 13 and the wheel flange 2.

The part of the wheel hub 1 forming the inner bearing ring 3 has been provided with two bearing tracks 5 arranged at a distance from one another around the bearing axis x—x. The plane extending at a right angle relative to the bearing axis x—x between the two bearing tracks 5 has been given the reference symbol y—y. The bearing tracks 5 contain rolling members 20 which also roll in corresponding bearing tracks 6 of the outer bearing ring 4.

The bearing tracks 5 in the inner bearing ring 3 and the bearing tracks 6 in the outer bearing ring 4 are arranged in such a way that the plane extending through their points of contact with the rolling members 20 extends at an angle relative to the axis of rotation x—x, intersecting the plane y—y in the direction towards the bearing axix x—x. It is a double-row angular contact ball bearing. The rolling members 20 are held in a joint cage or in a cage 8 for each bearing row. The outer circumferential face 19 of the outer bearing ring 4 is received in a bored step 12 of the wheel carrier 11 of the motor vehicle. It is received on part of the axial extension A of the outer bearing ring. The outer bearing ring 4 is attached to the wheel carrier 11 by fixing bolts 15. The outer bearing ring also comprises sealing caps 10 one of which covers part of its circumferential face 19. The sealing caps 10 are contacted by sealing lips of seals 9 which are also arranged at the wheel hub.

The outer bearing ring 4 has been divided into two parts. Its two ring parts 4a and 4b are produced after machining of the outer bearing ring 4 and its tracks 6 and breaking it apart.

The outer bearing ring 4 is broken apart in that starting from the annular notch 33 extending across the outer circumference 19 of the outer bearing ring 4 and continuing to a further notch 34 extending circumferentially in the inner face of the outer bearing ring, a joint 24 occurs after the application of pressure. The joint 24 is irregular and permits rejoining of the two ring parts 4a and 4b in one single position only. The circumferentially extending notches 33, 34 are offset relative to each other in respect of the axial extension A of the outer bearing ring 4.

The inner notch 34 is closer to the plane y—y than the outer notch 33. The inclined extension of the joint 24 which is due to the above arrangement of the notches 33, 34 and which, looking at the entire circumference, takes an approxiamately conical course, ensures radial centring of the two ring parts 4, 4b relative to each other. In addition, this design achieves a close connection in the case of distortion, accommodating any tilting moments that might occur. The inner face of the outer bearing ring contains a sealing ring 32 preventing any lubricants entering the joint 24 from the bearing.

BY providing the sealing cap 10 with a region which also partially covers the outer face 19 of the bearing ring 4 the two ring parts 4a, 4b are clamped together thereby producing one unit which can be supplied separately to a vehicle manufacturer and is then connected to the wheel carrier 11 via bolts 15.

Figure 2:
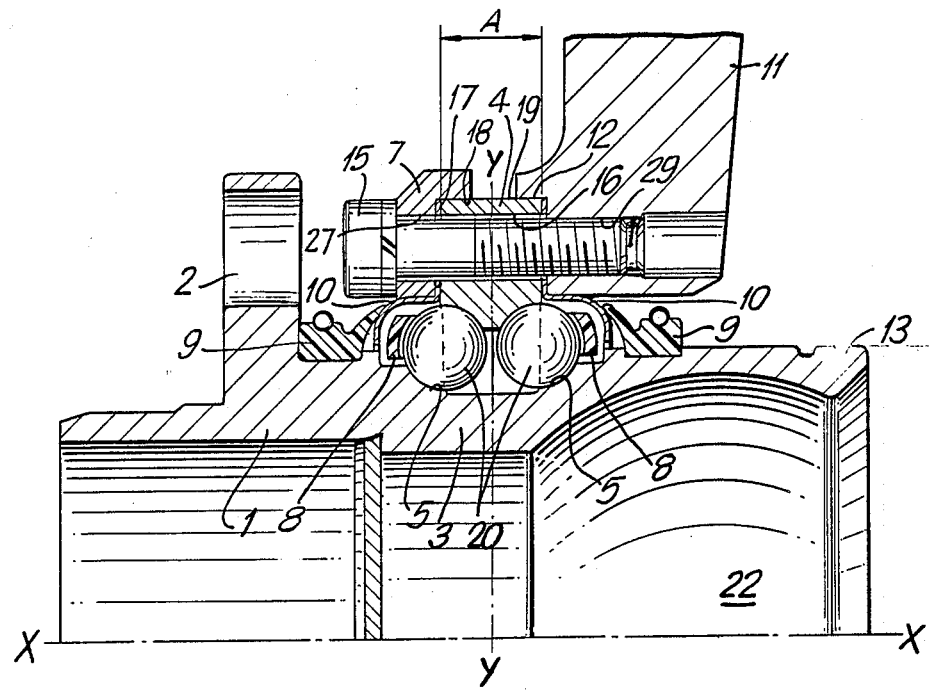
Figures 3, 4:
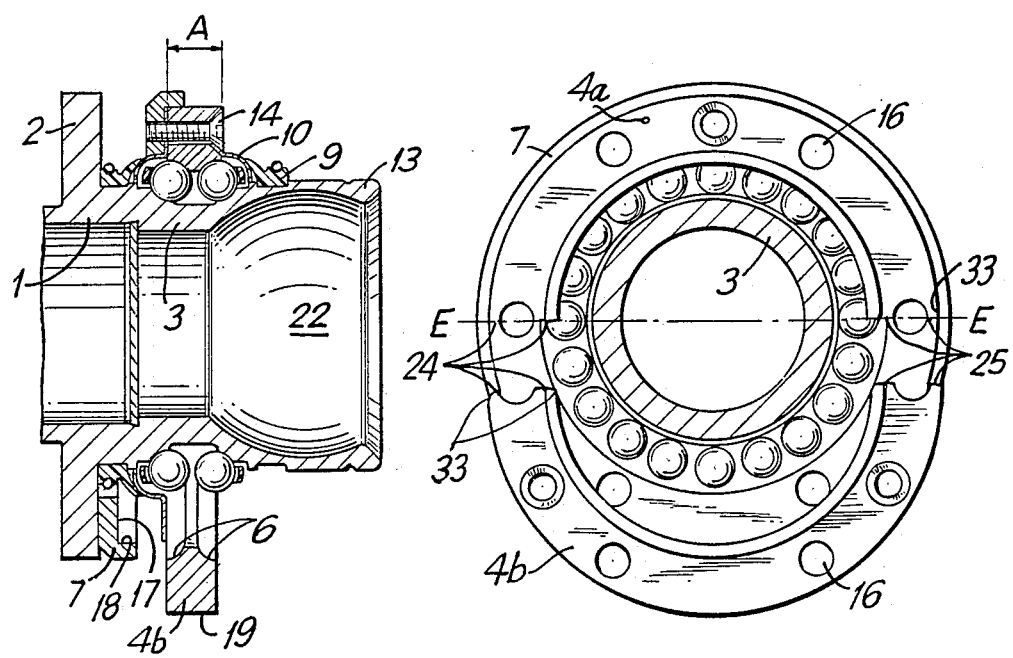

In the embodiment to FIGS. 2, 3 and 4, the outer bearing ring 4 has been broken apart in two places across its circumference. Breaking was achieved with the help of two notches extending parallel to the axis of rotation x—x across the axial extension of the outer face 19 of the outer bearing ring 4. The outer bearing ring 4 has been provided with a through-bore 16 through which the fixing bolts 15 are guided. Furthermore, the outer bearing ring 4 is partially embraced by a holding ring 7 having a cylindrical inner face 18 designed to match the outer face 19 of the bearing ring 4.

The radial face 30 of the outer bearing ring 4 either directly contacts a corresponding stop face 17 of the holding ring or a radially extending part of the sealing cap 10 is arranged between them. The holding ring 7 has been provided with bores 27 corresponding to the throughbores 16 in the outer bearing ring 4, through which the fixing bolts 15 are guided. The threaded ends of the fixing bolts 15 engage a correspondly threaded bore 29 in the bored step 12 of the wheel carrier 11. The other radial face 31 of the outer bearing ring 4 either directly contacts a corresponding face of the wheel carrier 11 or, preferably, the radially extending part of the other sealing cap 10 has been arranged between them. The holding ring 7 ensures radial support of the outer bearing ring 4 which, without such radial guidance, would fall apart because of its division.

The outer bearing ring 4 is divided into two parts in the radial plane E—E and comprises two joints 24, 25 which are arranged in such a way that they are positioned in the region of the bores 16 for the fixing bolts 15. Furthermore, bores 28 are distributed across the circumference of the outer bearing ring for the purpose of holding assembly bolts 14 which engage corresponding threaded bores in the holding ring 7, thereby producing a pre-assembled unit preventing the two ring parts 4a, 4a of the outer bearing ring 4 from falling apart after installation. The upper half of FIG. 4 shows the unit in the assembled condition and the lower half illustrates the unassembled ring part 4b before being moved into its final position.

The cage or the cages 8 for the bearing members 20 are designed in such a way that, for the purpose of assembly, first the seals 9 adjoining the wheel flange 2, then the holding ring 7 with the first sealing cap 10 are slid on. As illustrated in the lower half of FIG. 4, the holding ring 7 is made to contact axially the wheel flange 2. Subsequently, the balls 20 are pressed into the cages 8 and because of the design of the cages, they are held in this position. Then the two halves 4a, 4b of the outer bearing ring are introduced radially.

When the two bearing ring parts 4a, 4b have assumed the accurate position relative to each other and to the two rows of rolling members 20, the holding ring 7 may be moved from its position towards the left towards the right in the direction of the outer joint part 13 via the outer face 19 of the bearing ring 4. Subsequently, the holding ring 7 is bolted to the two parts 4a, 4b of the outer bearing ring by means of assembly bolts 14 which can simultaneously act as axial holding means for the further sealing cap 10. When finally the sealing ring 9 is fitted, a unit for final installation into the vehicle by the vehicle manufacturer is available.

The embodiment to FIG. 3 differs essentially from that to FIG. 2 in that the holding ring 7 covers the entire axial extension A of the outer bearing ring 4 and is held by an axially following clamping ring 21 in the holding ring and in that there is only one joint 24.

There now follows a description of the assembly. First the sealing ring 9 adjoining the wheel flange 2 and then the clamping ring 21 and the associated sealing cap 10 are slid on. Furthermore, the cage 20 for the rolling member row to the left of plane y—y and the associated rolling members 20 are introduced. Subsequently, the outer bearing ring 4 is slid over from the end of the outer joint part 13 so that, with its track 6, it rests against the rolling members 20 which have already been inserted. Subsequently, after introduction of the cage 8, the rolling members 20 of the bearing row to the right of plane y—y are introduced at an angle through the gap produced by expanding the outer bearing ring 4 in the region of the joint 24. In the process, the inner bearing ring 3 is turned on in the circumferential direction so that each time a further ball may be inserted into its position through the gap. After all rolling members 20 have been inserted, the holding ring 7 is slid over the outer face 19 of the outer bearing ring 4 and from the end of the outer joint member 13 the second sealing cap and the associated sealing ring 9 are slid on.

With the embodiments to FIGS. 2 to 8, the tracks 5 and 6 in the inner bearing part 3 and the outer bearing ring 4 are arranged in such a way that the point of intersection of the contact line of the two bearing rows of the outer and inner bearing tracks extending through the contact points is positioned radially outside the two bearing tracks 6 of the outer bearing ring 4. With reference to the axis of rotation x—x, this results in an increased basis of support for the bearing for receiving the tilting moments.

Figure 8:
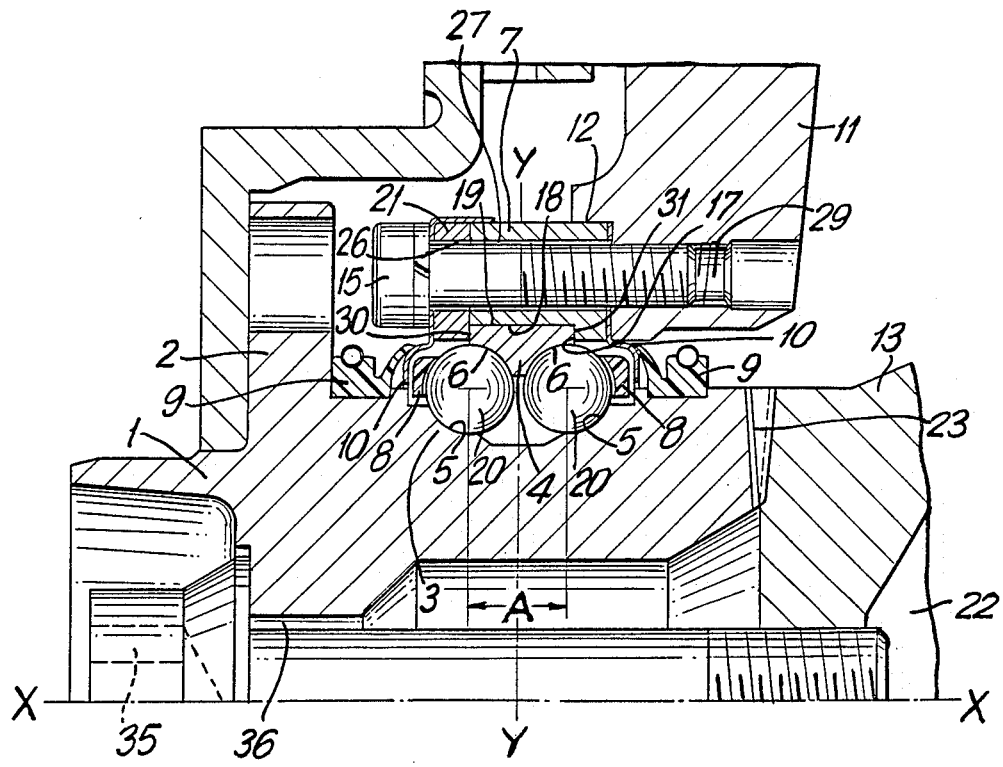
FIG. 8 shows an embodiment to FIG. 5 in the case of which the driving joint is connected to the inner bearing ring by teeth.

Whereas in the embodiments to FIGS. 1 to 7, the outer joint part 13 of the driving joint in the form of a constant velocity universal joint provided for driving the wheel flange 2 forms one unit with the wheel hub, the driving joint 22 in the embodiment to FIG. 8 and thus its outer joint part 13 is separate from the wheel hub 1. However, both are connected to each other via teeth 23 provided at the end face of the part of the wheel hub 1 positioned away from the wheel flange 2. The outer joint part 13 has been provided with corresponding teeth. Furthermore, the wheel hub 1 and the outer joint part 13 are secured axially and non-rotatingly by a bolted connection 30 arranged in the central bore 36 of the wheel hub 1.

The outer bearing ring of all embodiments is produced in that first, in the soft condition, it is machined in a chip or non-chip forming way by achieving the finish-dimension required prior to the actual grinding process. Furthermore, the outer bearing ring is provided with notches arranged in those areas from where the joints are to start and in which they are to end. After producing the joints by applying pressure the outer bearing ring 4 is hardened and then ground to its finish-dimension. Then the outer bearing ring 4, with one of the notches 33, 34 is placed on to the blade of a tool, with pressure being exerted on to it or rather its outer circumference. This pressure presses the outer bearing ring 4 from its round shape into a shape deviating from the round one, with the pressure being applied for long enough and in a magnitude to ensure that the limit of elastic deformation of the outer bearing ring 4 from its round shape is exceeded causing it to be broken apart in the region of the intended joints 24 or 24 and 25. In case the joint 24 extends through the bearing track 6 of the outer bearing ring 4, the breaking process has to be followed by precision machining, especially honing.

LIST OF REFERENCE NUMBERS

1: wheel hub
2: wheel flange
3: inner bearing ring
4, 4a, 4b: outer bearing ring
5: track of the inner bearing ring
6: track of the outer bearing ring
7: holding ring
8: cage
9: seal
10: sealing cap
11: wheel carrier
12: bored step in wheel carrier
13: outer joint part
14: assembly bolt
15: fixing bolt
16: through-bore for fixing bolt in outer bearing ring
17: stop face in holding ring 7
18: inner face of holding ring
19: outer face of outer bearing ring
20: rolling member
21: clamping ring
22: driving joint
23: teeth
24, 25: joint
26: through-bore for fixing bolt in clamping ring
27: through-bore for fixing bolt in holding ring
28: bore for assembly bolt
29: threaded bore in wheel carrier
30, 31: radial face of outer bearing ring
32: sealing ring
33, 34: notch
x—x: axis of rotation
E—E: dividing plane
A: axial extension of the bearing ring
y—y: radial plane
35: holding bolt
36: bore

What is claimed is:

1. A bearing assembly of a driveable wheel hub at an associated wheel carrier of a motor vehicle, comprising a double-row rolling element bearing having an outer divided bearing ring (4) provided so as to be fixable to the wheel carrier, and an inner single-part bearing ring (3) arranged so as to form a single unit with a wheel flange for attaching the vehicle wheel, the outer bearing ring (4) being broken apart in an area (24) of its circumferential extension so as to be divided into two parts, said area (24) being essentially conical about a rotary axis (x—x) of the assembly, each of said two parts including a track (6a, 6b) for one row of said double-row rolling element, the inner bearing ring being integral with a component (13) of a driving joint (22) provided for driving the vehicle wheel or connected to said component.

2. A bearing assembly according to claim 1, wherein said area (24) extends between an outer and an inner circumferential notch (33, 34) in said outer bearing ring (4).

3. A bearing assembly according to claim 2, wherein said inner notch (34) is closed by a sealing ring (32) so as to prevent lubricant from entering said area (24).

4. A bearing assembly according to claim 3, wherein the outer notch (33) is closed by a sealing cap (10) which also extends over a radial face of the outer bearing ring (4).

5. A bearing assembly according to claim 2, wherein the outer notch (33) is closed by a sealing cap (10) which also extends over a radial face of the outer bearing ring (4).

* * * * *

UNITED STATES PATENT AND TRADEMARK OFFICE
CERTIFICATE OF CORRECTION

PATENT NO. : 4,966,473

DATED : October 30, 1990

INVENTOR(S) : Werner Jacob

It is certified that error appears in the above-identified patent and that said Letters Patent is hereby corrected as shown below:

ON TITLE PAGE:

[30] Foreign Application Priority Data

December 19, 1986 [DE] F.R. of Germany.... P 36 43 484.1

Signed and Sealed this

Twenty-eighth Day of April, 1992

Attest:

HARRY F. MANBECK, JR.

Attesting Officer

Commissioner of Patents and Trademarks